United States Patent [19]

Weihrauch

[11] Patent Number: 4,646,381

[45] Date of Patent: Mar. 3, 1987

[54] TOOTHBRUSH

[75] Inventor: Georg Weihrauch, Waldmichelbach-Affolterbach, Fed. Rep. of Germany

[73] Assignee: Coronet-Werke Heinrich Schlerf GmbH, Fed. Rep. of Germany

[21] Appl. No.: 745,896

[22] Filed: Jun. 18, 1985

[30] Foreign Application Priority Data

Jun. 19, 1984 [DE] Fed. Rep. of Germany ....... 3422623

[51] Int. Cl.⁴ ............................................. A46B 9/04
[52] U.S. Cl. .................................. 15/167 R; 15/187; 300/21
[58] Field of Search ..................... 15/159 A, 186, 187, 15/188, 167 R, 110; 300/21

[56] References Cited

U.S. PATENT DOCUMENTS 2,783,490 3/1957 Kutik ...................................... 15/187
3,545,025 12/1970 O'Connell ......................... 15/167 R
4,255,224 3/1981 Lorenz .............................. 300/21 X

FOREIGN PATENT DOCUMENTS 1532809 4/1970 Fed. Rep. of Germany .... 15/167 R
2840833 4/1980 Fed. Rep. of Germany ........ 15/187
 705725 3/1954 United Kingdom ............ 15/167 R
2035076 6/1980 United Kingdom .................. 15/187

Primary Examiner—Peter Feldman
Attorney, Agent, or Firm—McCormick, Paulding & Huber

[57] ABSTRACT

In a toothbrush with a body providing a brush head and a handle and bristles fastened to the brush head, a hygienic, bacteria-avoiding construction is obtained in that the body and bristles are made of the same material and are welded to one another so that the brush head is free of empty space. Further, with this construction a larger number of bristles can be applied to achieve a better cleaning and massaging effect and the dimensions of the brush head can be reduced.

7 Claims, 6 Drawing Figures

TOOTHBRUSH

The invention relates to a toothbrush having a plastic body, providing a brush head and a handle, and plastic bristles fastened to the brush head.

Toothbrushes have hardly changed in decades with regard to their construction. Changes which have occurred have taken place only in technological areas in that the wood previously used for the brush head and handle as well as the natural bristles used for insertion into the bristle head have been replaced by plastics. Also the manufacturing technique has remained substantially unchanged in that the brush head is provided with holes into each of which a bristle bundle is fastened by means of small metal pieces, metal wire or the like. Along with this polyamide plastic, for example polyamide 6.12, has been especially approved for the bristles since this plastic most nearly satisfies the requirements set for a good toothbrush with respect to its hardness, its ability to return to an upright state, and its recoverability. This material has a relatively low water-absorbing capacity so that the toothbrush quickly dries. This in turn is of significance because a dry bristle better fulfills the required properties with respect to stiffness, ability to return to an upright position, etc., than does a damp bristle. However, a toothbrush does not dry or dries only incompletely during the usual intervals of about twelve hours between uses so that moisture is retained for long times, especially in the regions of the bristles at which they are fixed to the brush head. This defect further becomes greater the closer the bristles stand to one another and the larger the number of bristles per unit of surface area. Since however the cleaning and massaging effect increases with the number of bristles per unit area, this desired increase in the usefulness of the brush is obtained only with the accompanying disadvantageous effects produced by the longer drying.

The longer retention of moisture in toothbrushes has the further disadvantageous effect that bacteria appearing at the region where the bristles are fastened to the brush head find a good climate for reproduction and therefore leads without forewarning to a hygienic problem, which is of direct special significance because of the use of the brush in the mouth.

The invention therefore has as its object the provision of a toothbrush of the foregoing type wherein the bristles dry faster than in previous brushes, especially in the areas at which they are fastened to the brush head, thereby providing an hygienically improved toothbrush even in the case of short intervals between uses.

This object is solved in accordance with the invention by having the body and the bristles made of the same plastic and welded to one another so that the brush head is free of empty spaces.

Brushes of different types are indeed already known with welded on bristle bundles wherein the brush body and bristles are made of polypropylene. This technology has previously not been applied to toothbrushes since polypropylene is not a suitable material for the bristles. Furthermore, the technology of large surfaced brushes has not previously been applicable to the manufacture of toothbrushes. On the contrary in the case of entirely plastic toothbrushes the bodies have been made of PP, ABS, or SAN and have been filled with bristles made of polyamide. The bristles have been anchored in blind holes in the brush head by means of wire. Of crucial importance is the increase in the service properties achieved with the invention. Practical investigations have shown that a toothbrush made in accordance with the invention dries faster than customary toothbrushes and that a substantially smaller number of bacteria are to be found. The reason for this is that the fastening of the bristles in accordance with the invention no longer requires any holes in which previously the remains of toothpaste and other dirt have been held fast and which at the same time have held a substantial portion of the moisture content in that water or moisture is held in the holes through capillary action. In the case of the construction according to the invention neither toothpaste nor other dirt or moisture finds any empty space in which to take hold. With a customary toothbrush about one-third of the original empty space defined by the holes remains even after the holes are filled with bristles. Finally because of the quicker drying of the bristles in their root areas the bristles are more quickly returned to their original condition in the areas which control the rigidity and therewith the service properties. Since the construction of the invention also is no longer tied to a bundlewise insertion of the brush head and is also not tied to the arrangement of holes, if need be substantially more bristles, for example up to ten thousand in comparison to three thousand previously, can be associated with the same surface area and the bristles can be arranged in different desired geometric configurations.

Investigations with users have also further shown that a toothbrush made in accordance with the invention has been favorably received not only with respect to its cleaning properties but in general as being psychologically pleasant. The reason for this is not yet entirely clear but it is apparently due to the fact that the previously used metal wire or small metal plates for fastening the bristle bundles lead to the creatton of an electrical potential and/or to an influence on the ph value in combination with metallic dental work materials in repaired or restored teeth.

It is possible to provide holes in the bristle-receiving side of the brush head in which individual bristle bundles are welded, with the bristle head and the bristle bundles on their facing sides being melted to such a degree that the holes after the insertion of the bristle bundles become entirely closed. Preferably, however, the bristle-receiving side of the brush head is formed flat and the bristles are butt welded to it.

The avoidance of the brush holes made possible by the invention produces the further advantage of a better rigidity of the brush head. The previously required holes lead to a corresponding reduction in the cross sectional area and therefore lead to a lower bending and shear strength for the brush head so that in the case of underdimensioned brush heads it not seldom happens that during use the heads break right at the area of the bristle insertion. Such brush heads are not strengthened by the metal anchors for the bristle bundles since these exert a wedging effect. These difficulties are also effectively avoided by the invention since the bristle head has a full cross section over its entire extent and therefore a uniform rigidity over such entire extent. Polyamide 6.12 or polyester has proved to be an especially advantageous work material even though the invention is not limited to these particular materials. It is only essential that the material selected have the necessary service properties required for a toothbrush.

According to a further preferred embodiment the bristles are welded to the brush head by means of noncontacting heating. Such noncontacting heating of bristles was previously not practical, but is important with polyamide and other plastics to obtain a faultless weld connection and to avoid discoloration, oxidation and the formation of threads in the melt. Further with such a connection the force required to pull out the bristles is increased so that no danger of pulling out bristles exists during the subsequent processing of the free ends of the bristles for the purpose of rounding them off.

The construction of the invention also makes it possible for the brush head to have a thickness of only 2 to 4 mm in comparison to the previous thickness of from 5 to 6 mm, so that on one hand the material required in the area of the brush head is lowered and on the other hand the thickness of the brush head with respect to the bristle length can be designed within wider limits so that an increase in the range of service properties is possible. A shallow construction heighth is also possible and may be of benefit where, because of a tight mouth or jaw space, customary toothbrushes cannot be employed or can be employed only with difficulty because of possible damage to the jaw joint or other similar harm.

The invention also opens the possibility of fastening more than three thousand and indeed up to ten thousand bristles to the brush head whereas customary toothbrushes have up to two thousand bristles and special brushes up to three thousand bristles. This larger number of bristles per unit area is possible because with the construction of the invention no definite minimal spacing between individual holes must be provided and also no mechanical anchoring of the brushes need be provided, the bristles therefore being capable of being spaced much more closely to one another. Looking at it in the opposite way, with a similar number of bristles the size of the bristle head can be considerably reduced so that small toothbrushes, for small children or the above-mentioned circle of users, can be obtained which have at least as good cleaning and massaging effects as the customary larger toothbrushes for adults.

The invention also provides the further possibility of welding the bristles to the brush head either in bundles or individually. Individually standing bristles can therefore cover the entire surface or on different portions of the surface can be arranged in different contours and/or different distributions. For example, they can be arranged to be distributed over a surface area and be combined with bristles connected together in different kinds of bundles in order for example to produce different effects at the individual brush areas of a toothbrush or different wear or abrasion characteristics.

Advantageously, in one embodiment in the area of the brush head remote from the handle the bristles are individually standing and distributed over such surface area, in the remaining edge area of the brush head they are individually standing and arranged in strips and in the middle area of the brush head they are fastened together in different kinds of bundles.

Hereinafter the invention is described in connection with embodiments shown by the drawings.

The drawings are:

Figure 1A:
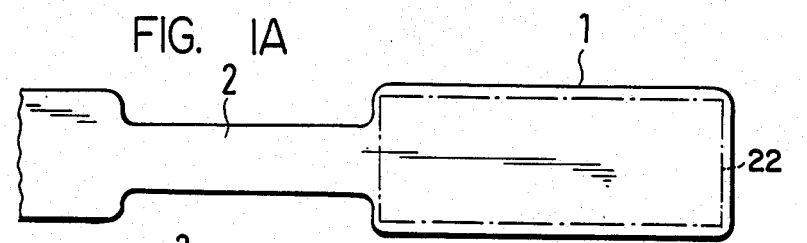
FIG. 1A is a plan view of a brush handle used in making a toothbrush embodying the invention.
Figure 1B:
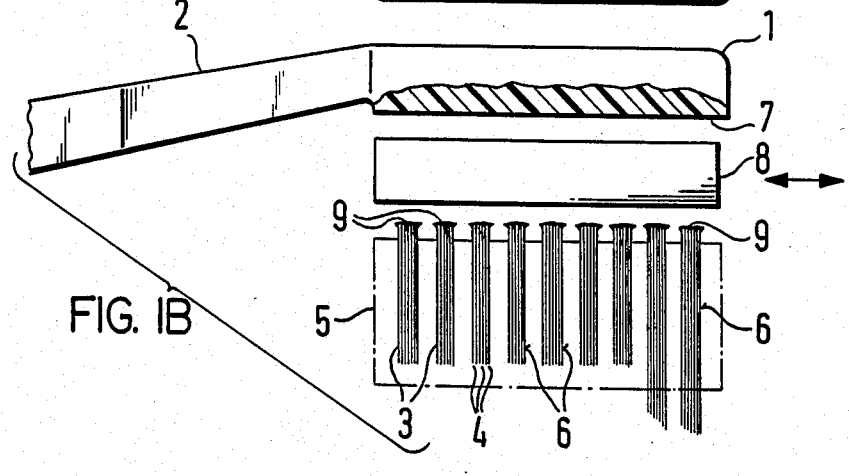
FIG. 1B is a side view of the brush handle of FIG. 1A in combination with other parts used in making a toothbrush embodying the invention.

FIG. 1A and FIG. 1B show schematically a device for manufacturing a toothbrush. In these figures is seen in both plan view and side view the handle 2 with a generally rectangular brush head 1. The brush head 1 and the handle 2 are made of plastic, for example polyamide, and are held by a nonillustrated receiver. Spaced therefrom are a number of bundles 3 of bristles 4, made for example of polyamide, arranged respectively in receivers 6 of a carrier 5. Each bristle bundle 3 can already be cut to its desired length before being placed in the carrier 5 or can be inserted into the carrier 5 as an endless strand as shown at the right in FIG. 1B. In the illustrated example the heating of the receiving side 7 of the brush head 1 as well as of the ends of the bristle bundles 3 is accomplished by means of a plate-shaped heating element 8 arranged between the bristle head 1 and the free ends of the bristle bundles 3. The heating element 8 is movable in the direction of the double arrow shown at the right and can therefore be brought into the space between the bristle head 1 and the bristle bundles 3 and after the melting of the ends of the bristle bundles 3 and of the receiving side 7 of the brush head 1 can be withdrawn so that the brush head and bristle ends can be moved into engagement with one another. In FIG. 1A the melt zone of the bristle receiving side 7 is indicated by the broken lines 22.

Figure 2:
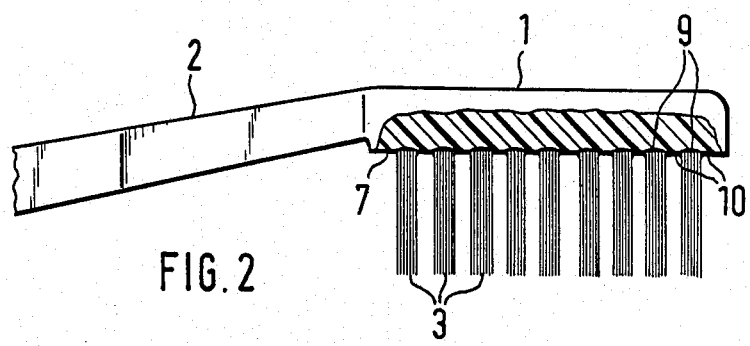
FIG. 2 is a side view partially in section showing one embodiment of a finished toothbrush.

In the heating of the bristles by the moving into place of the heating element 8 the free ends of the bristles 4 are melted solely without contact with the heating element so that they melt together and form a rounded off lens-shaped head 9. With the heads of the bundles in this form the bristle bundles 3 and the brush head 1 are brought into contact with one another and the thickened ends 9 are pushed under pressure into the melted receiving side 7 of the bristle carrier until they reach the position shown in FIG. 2 whereat each bristle bundle forms a shallow ring-shaped protuberance. In the case of using endless bristle strands the strands are cut to length after this step of the process. Instead of the illustrated use of bristles in bundles of the type shown at 3 the bristles can also be used in either larger or smaller groups in any desired configuration.

Figure 3:
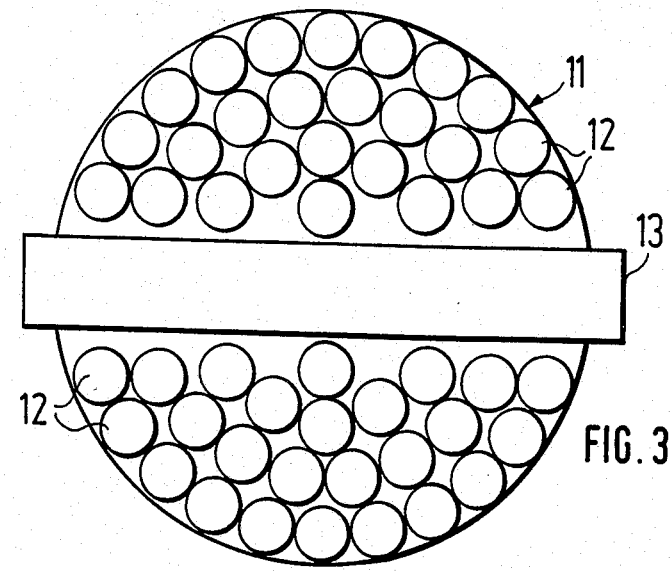
FIG. 3 is an enlarged plan view of a bristle bundle of customary construction.
Figure 4:
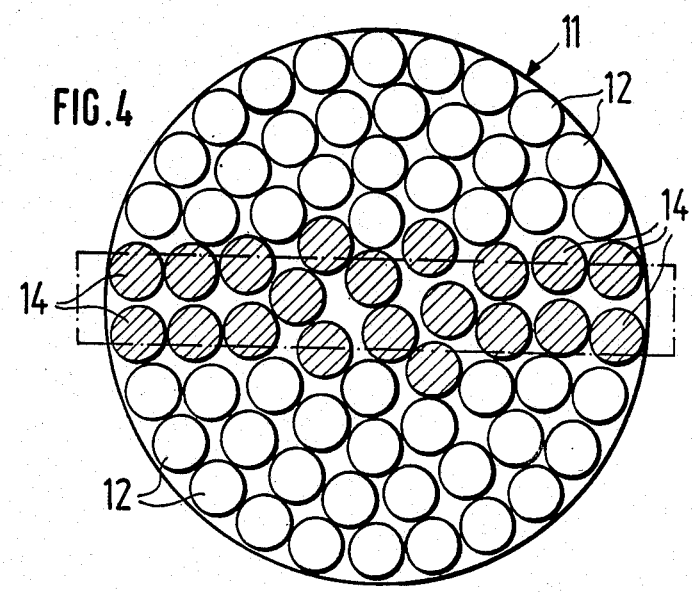
FIG. 4 is an enlarged plan view of a bristle bundle made in accordance with the invention.

FIG. 3 shows an individual bristle bundle 11 of the usual arrangement whose bristles 12 are anchored in a hole of the bristle head by means of a metal wire 13. From FIG. 4 it can be seen that in the same bundle type of arrangement with the same surface area additional bristles, such as shown by cross hatching, can be used in the case where the bristles are applied by welding.

Figure 5:
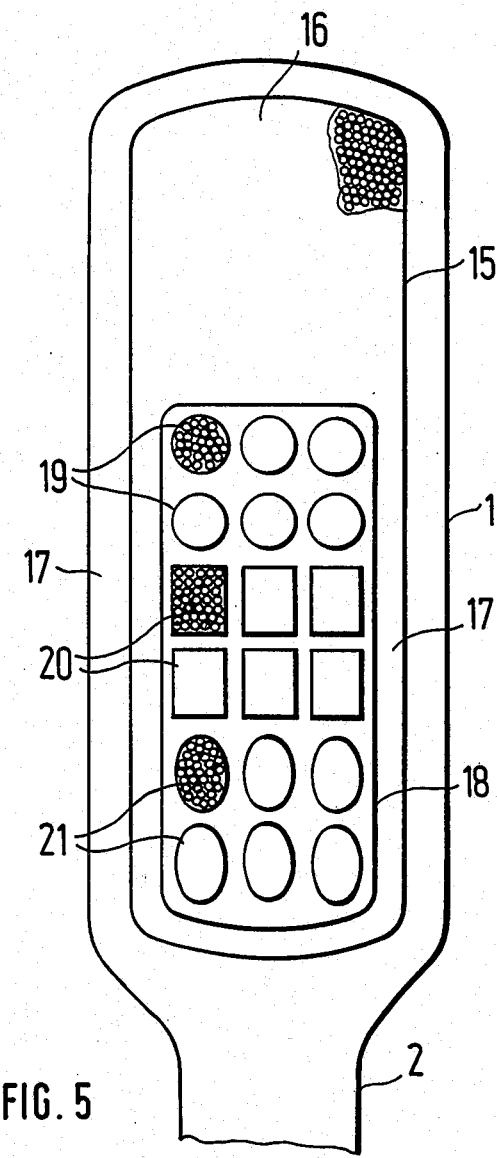
FIG. 5 is a view showing the bristles of a toothbrush made in accordance with the invention and falling within the possible range of variation.

FIG. 5 shows one possible arrangement of bristles in a brush made in accordance with the invention. The brush head 1 has a brush-containing surface bordered by the line 15. On this surface in the area 16 remote from the handle 2 the bristles stand individually close to one another so as to cover the surface to which they are welded. A similar surface covering but strip formed arrangement is provided along the edge area 17 of the bristle carrying surface. Moreover, in the middle area which is bordered by the line 18 the bristles are connected in the form of bundles 19, 20 and 21, the forward bundles 19 being of circular shape, the middle bundles 20 being of rectangular shape and the bundles 21 closest to the handle being of oval shape.

I claim:

1. A toothbrush comprising a plastic body providing a brush head and a handle, a plurality of plastic bristles, said body and said bristles being made of the same plastic material, said brush head having at least first and second different areas with each of which areas some of said bristles are associated, the bristles associated with said first area being individually standing bristles distributed over said first area and the bristles associated with said second area being arranged in bundles spaced from one another over said second area, welds made of said plastic material fixing said individually standing bristles to said first area of said brush head, and other welds made of said plastic material fixing each of said bundles of bristles to said second area of said brush head.

2. A toothbrush as defined in claim 1 further characterized in that all of said welds are such that said brush head is free of empty space.

3. A toothbrush as defined in claim 1 further characterized in that the individually standing bristles associated with said first area substantially cover said first area.

4. A toothbrush as defined in claim 1 further characterized by some of said bundles of bristles having cross-sectional shapes substantially different from the cross-sectional shapes of the other of said bundles.

5. A toothbrush as defined in claim 1 further characterized by said brush head having a generally elongated face with two side edges, said second area to which bristles are fixed in bundles being a middle area of said face located between and spaced from said two side edges, and said first area to which bristles are fixed in individually standing fashion including two elongated strips each located between said middle area and the adjacent one of said two side edges.

6. A toothbrush as defined in claim 5 further characterized by said elongated face of said brush head having a first end remote from said handle, said middle area of said face terminating short of said first end of said elongated face, and said first area to which bristles are fixed in individually standing fashion including a portion of said face located between said middle area and said first end of said face.

7. A method for making a toothbrush comprising the steps of providing a plastic body having a brush head and a handle and with said brush head having a substantially smooth face, providing a plurality of plastic bristles of the same plastic material as said body, grouping at least some of said bristles into bundles, simultaneously heating ends of said bristles and said smooth face of said brush head by non-contacting heating means until a surface layer of the material comprising said brush head adjacent said face is melted and until the heated ends of said bristles are melted with the melting of the heated ends of said bristles which make up said bundles causing each of the associated ends of said bundles to take on a rounded shape, and then moving said smooth face of said brush head and said heated ends of said bristles into engagement with one another to weld said bristles to said brush head with said brush head remaining free of empty space.

* * * * *